United States Patent [19]

Nahm et al.

[11] Patent Number: 5,351,759
[45] Date of Patent: Oct. 4, 1994

[54] SLAG-CEMENT DISPLACEMENT BY DIRECT FLUID CONTACT

[75] Inventors: James J. W. Nahm, Houston, Tex.; Kazem Javanmardi, Slidell, La.

[73] Assignee: Shell Oil Company, Houston, Tex.

[21] Appl. No.: 964,988

[22] Filed: Oct. 22, 1992

[51] Int. Cl.$^5$ .............................................. E21B 33/14
[52] U.S. Cl. .................... 166/293; 166/285; 166/292; 166/295
[58] Field of Search ............... 166/285, 291, 292, 293, 166/294, 295; 507/140; 175/64, 65, 66

[56] References Cited

U.S. PATENT DOCUMENTS

| | | |
|---|---|---|
| 2,336,723 | 12/1943 | Drummond . |
| 2,582,909 | 1/1952 | Laurence ........................ 166/291 |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |

(List continued on next page.)

FOREIGN PATENT DOCUMENTS

| | | |
|---|---|---|
| 85-144069/24 | 7/1983 | Japan . |
| 61-48454 | 3/1986 | Japan . |
| 833704 | 6/1981 | U.S.S.R. . |

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.

"Mud Disposal: An Industry Perspective", Hanson et al, Drilling, May 1986, pp. 16-21.

"Waste Minimization Program Can Reduce Drilling Costs", Hall et al, Oryx Energy Co., Houston, Tex., Oil & Gas Journal, Jul. 1, 1991, pp.43-46.

"Phosphoric Acids and Phosphates", Kirk-Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575 (Oct. 4, 1992) by Cowan et al.

"Quantitative Interpretation of X-Ray Diffraction Patterns of Mixtures. I. Matrix-Flushing Method for Quantitative Multicomponent Analysis" by Frank H. Chung, J. Appl. Cryst. (1974) 7, pp. 519-525.

*Primary Examiner*—George A. Suchfield

[57] ABSTRACT

A wellbore is drilled utilizing a conventional drilling fluid or a drilling fluid such as one containing a cementitious component selected from blast furnace slag, a metal oxide component of an ionomer or a metal oxide component of a phosphate salt. A compatible cementitious slurry such as one containing blast furnace slag and an activator system is then introduced into the borehole and displaced up into an annulus by direct contact with a displacement fluid. Generally, in the case of the slag-containing drilling fluid the cementitious slurry is prepared by adding additional blast furnace slag and an activator such as a sodium hydroxide/sodium carbonate mixture to the used drilling fluid. Similarly, in the case of the ionomers or phosphates, additional metal oxide component and the reactive second component can be added to the used drilling fluid to produce the cementitious slurry.

21 Claims, 1 Drawing Sheet

U.S. PATENT DOCUMENTS

| | | |
|---|---|---|
| 3,835,939 | 9/1974 | McEntire . |
| 3,866,683 | 2/1975 | Maly et al. ............................ 166/292 |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4,427,320 | 1/1984 | Bhula . |
| 4,450,009 | 5/1984 | Childs et al. . |
| 4,460,292 | 7/1984 | Durham et al. . |
| 4,518,508 | 5/1985 | Conner ................................ 210/751 |
| 4,643,617 | 2/1987 | Kanno et al. ........................ 405/222 |
| 4,664,843 | 5/1987 | Burba, III et al. . |
| 4,668,128 | 5/1987 | Hartley et al. . |
| 4,674,574 | 6/1987 | Savoly et al. ....................... 166/293 |
| 4,690,589 | 9/1987 | Owa ..................................... 405/263 |
| 4,692,065 | 9/1987 | Suzuki et al. ........................ 405/211 |
| 4,720,214 | 1/1988 | Brasted et al. . |
| 4,746,245 | 5/1988 | Mork ................................... 405/224 |
| 4,760,882 | 8/1988 | Novak . |
| 4,761,183 | 8/1988 | Clarke . |
| 4,790,954 | 12/1988 | Burba, III et al. . |
| 4,880,468 | 11/1989 | Bowlin et al. . |
| 4,897,119 | 1/1990 | Clarke . |
| 4,913,585 | 4/1990 | Thompson et al. . |
| 4,942,929 | 7/1990 | Malachosky et al. . |
| 4,991,668 | 2/1991 | Rehm et al. . |
| 5,016,711 | 5/1991 | Cowan . |
| 5,020,598 | 6/1991 | Cowan et al. ....................... 166/293 |
| 5,026,215 | 6/1991 | Clarke . |
| 5,058,679 | 10/1991 | Hale et al. . |
| 5,082,499 | 1/1992 | Shen ................................... 106/735 |
| 5,086,850 | 2/1992 | Harris et al. . |
| 5,105,885 | 4/1992 | Bray et al. . |
| 5,106,423 | 4/1992 | Clarke . |
| 5,121,795 | 6/1992 | Ewert et al. . |
| 5,123,487 | 6/1992 | Harris et al. . |
| 5,125,455 | 6/1992 | Harris et al. . |
| 5,127,473 | 7/1992 | Harris et al. . |
| 5,133,806 | 7/1992 | Sakamoto et al. ................... 106/811 |
| 5,147,565 | 9/1992 | Bour et al. ......................... 252/8.551 |

U.S. Patent
Oct. 4, 1994
5,351,759
FIG. 1
(PRIOR ART)
FIG. 2
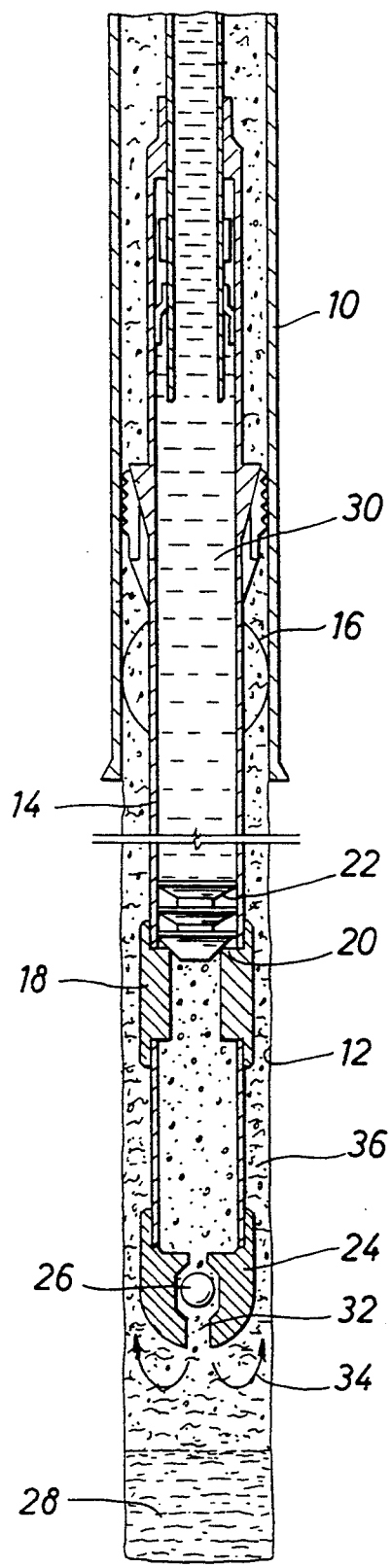
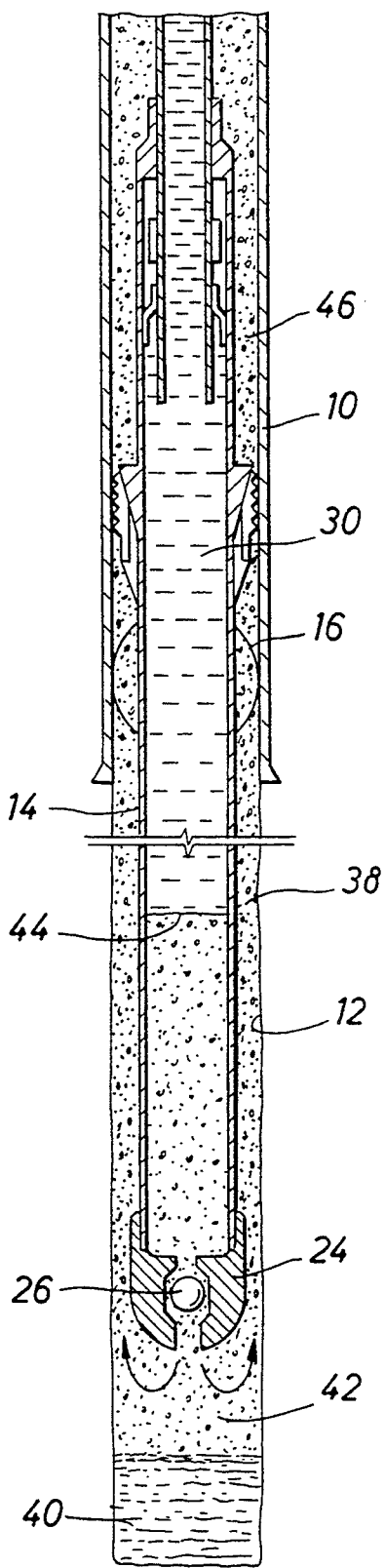

SLAG-CEMENT DISPLACEMENT BY DIRECT FLUID CONTACT

BACKGROUND OF THE INVENTION

This invention relates to drilling and cementing boreholes.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface between the drill string and the wall of the borehole.

Once the borehole has been drilled to the desired depth, it may be desirable to isolate the separate areas, zones or formations transversed by the borehole. For extraction of fluids from formations, a conduit (casing) must be inserted into the borehole extending from the surface downward, and liners may be hung inside the casing.

At this point it becomes necessary to fill the annulus between the casing and the borehole wall or between the liner and casing with a material which will seal the annulus and provide structural support for the casing or liner. This is commonly referred to as primary cementing.

Generally, the area below and surrounding the casing or liner being cemented is filled with drilling mud. Therein lies a problem that has created primary cementing difficulties throughout the history of cementing. Conventional Portland cement and conventional drilling muds are incompatible. Thus, as the cement is forced down the casing or liner and up into the annulus, mixes with drilling mud and the area around the end of the casing or liner being cemented as well as varying lengths of the annulus end up being filled with a mixture which does not set up into a strong cement.

It is generally necessary after setting each casing or liner to test the integrity thereof by means of a pressure test. However, if the area at the bottom end thereof is not sealed off, pressure testing fails. Hence, the industry has developed a complex system to circumvent this problem. A device generally known as a landing collar is attached to the bottom of the casing or liner being cemented. The casing or liner has an annular shoulder projecting inwardly. The cementitious slurry is introduced into the casing followed by a rubber wiper plug. Displacement fluid then pushes the wiper plug downward, thus displacing the cementitious slurry out of the casing and into an area at the bottom thereof where it changes direction and flows upwardly into the annulus. When the wiper plug reaches the area of the landing collar, it is stopped by the inwardly projecting shoulder and forms a seal so as to allow pressure testing, although a good seal is not always obtained. These problems are magnified with large diameter casings and liners.

Slag, broadly, as a cementitious material is shown in Tragessar, U.S. Pat. No. 3,557,876 (Jan. 26, 1971).

Cementing of the annulus between an oil well casing and the surrounding borehole has been practiced for over 90 years. Long ago, it was recognized that it would be advantageous to solidify drilling fluid in the annulus so as to reduce the cost of the cementing of the casings. Over the decades, various attempts have been made along this line as evidenced by the disclosures in Williams et al., U.S. Pat. No. 2,649,160 (Aug. 18, 1953), and Miller et al, U.S. Pat. No. 3,887,009 (Jun. 3, 1975). However, such techniques, while presumably operable, have failed to achieve commercialization even after the passage of many years. Another attempt in this direction is described in Wyant et al., U.S. Pat. No. 3,499,491 (Mar. 10, 1970), wherein Portland cement is used in an aqueous drilling fluid to produce a mud concrete. Portland cement, however, is very sensitive to the water/solids ratio. Even under ideal conditions, only small increases in the amount of solids results in a very viscous mass. On the other hand, only a slight decrease in the amount of solids results in a composition which sets up to give a very weak structure. These problems are amplified when attempting to use Portland cement in a drilling mud. Thus, while this technique has been used commercially, it has serious drawbacks.

Clarke, U.S. Pat. No. 4,761,183 (Aug. 22, 1988) and Clarke, U.S. Pat. No. 5,106,423 (Apr. 21, 1992) disclose finely ground slag in cementitious slurries for grout. The '423 patent, at column 2, line 6, refers to petroleum utilities.

SUMMARY OF THE INVENTION

It is an object of this invention to cement a casing or liner without the necessity for a wiper plug or a float collar.

It is a further object of this invention to achieve a good seal in the annulus, thus sealing the casing and the surrounding borehole or pipe and, in cases where there is a rat hole, a good seal at the bottom end of a casing or liner being cemented.

It is a further object of this invention to avoid the problems of incompatibility between drilling mud and cement at their interface during primary cementing.

It is yet a further object of this invention to economically seal large diameter casings and liners.

In accordance with this invention a borehole is drilled utilizing a drilling fluid; thereafter a pipe is inserted and a cementitious slurry made up of a member selected from the group consisting of blast furnace slag plus an activator, a metal compound proton acceptor plus a polymer, or a metal compound proton acceptor plus a phosphorus acid is introduced therein; thereafter a displacement fluid is introduced into the pipe in direct contact with said cementitious slurry and said cementitious slurry displaced down said pipe and up into an annulus surrounding said pipe.

BRIEF DESCRIPTION OF THE DRAWINGS

In the drawings, forming a part hereof, wherein in like reference characters denote like parts in the various views, FIG. 1 is a cross sectional representation of a borehole with a liner being cemented in accordance with the prior art; and FIG. 2 is a cross sectional view of a similar borehole with a liner being cemented in accordance with the invention.

DETAILED DESCRIPTION OF THE INVENTION

It has been discovered that by utilizing a cementitious slurry containing, for instance, blast furnace slag and an activator cementing can be carried out without the necessity of using a wiper plug and float collar, i.e., by means of direct contact between the displacement fluid and the cementitious slurry.

Definitions

In this description the term 'cementitious material' means either the hydraulic material, blast furnace slag, which, on contact with water and/or activators, hardens or sets into a solidified composition or a component which, on contact with a reactive second component, sets or hardens into a solidified composition. Thus, broadly, it can be viewed as a material which can chemically combine to form a cement.

A slurry of this cementitious material and the component or components which cause it to harden is referred to herein as a "cementitious slurry".

The term 'universal fluid' is used herein to designate those compositions containing cementitious material, which compositions are suitable for use as a drilling fluid, and which compositions thereafter, for the purpose of practicing this invention, have additional cementitious material and/or activators such as accelerators (or reactive second components) added to give a cementitious slurry.

By 'direct contact' between the displacement fluid and the cementitious slurry is meant that the displacement fluid directly contacts the upper surface of the column of cementitious slurry as opposed to having a wiper plug disposed between the cementitious slurry and the displacement fluid. This also allows the operation to be carried out without a float collar to stop the wiper plug.

The term 'hydraulic material' means a material which, on contact with water and/or activators, sets to a hard material.

The term 'pipe' means either a casing or a liner.

The term 'primary cementing' refers to any cementing operation wherein a cementitious slurry is passed down a pipe and up into an annulus surrounding the pipe and a borehole or prior casing and thus encompasses both the cementing of casings wherein the annulus is between the casing and the borehole wall and the cementing of liners where the annulus is between the liner and the casing.

By 'activator system' is meant either the activators as in the case of blast furnace slag or the reactive second component of the proton acceptor metal compounds. The reactive second component is either a polymer as described in detail hereinafter or a phosphorus acid as described in detail hereinafter.

Process Detail

Referring now to FIG. 1, there is shown a conventional cementing operation wherein a wellbore has been drilled in a subterranean formation. A casing 10 is shown in an upper portion of the wellbore and a further extension of the wellbore as defined by wellbore walls 12 is depicted. Disposed within said wellbore is a liner pipe 14 to be cemented in place. Centralizers 16 center the liner pipe. Disposed at the bottom of the liner pipe is a landing collar 18 having an annular shoulder 20. Disposed within the liner pipe is wiper plug 22. A float shoe 24 having valve 26 is affixed to a lower portion of the landing collar. The borehole from the bottom thereof up to just below the float shoe is filled with the drilling fluid or mud from the drilling operation, the drilling fluid or mud being depicted by reference character 28. This part of the borehole is called the rat hole and is generally present although the float shoe can rest on the bottom of a borehole.

FIG. 1 represents the prior art and shows the stage of the cementing operation wherein displacement fluid 30 has pushed wiper plug 22 down liner pipe 14 until it rests against shoulder 20 of landing collar 18, thus forming a seal. The cementitious slurry 32 has been forced down through valve 26 and out the bottom of the float shoe as indicated by the arrows 34. In doing this, the cementitious slurry 32 mixes with drilling fluid or mud 28 to form an incompatible mixture 36 just below the float shoe and up the annulus between the float shoe and the borehole wall. Although not shown, this weak cement/mud mixture extends to varying degrees up the annulus between the casing 10 and the liner pipe 14, essentially all the way to the top of the annular cement column. Thus, the wellbore is not well sealed. Hence the need for the seal between the wiper plug 22 and annular shoulder 20 of landing collar 18. The Figure shows the operation just as the cement has been displaced into the annulus. As it is setting, the drilling fluid migrates up the inside of the float shoe and landing collar giving a weak cement or even causing the cementitious slurry not to set in a reasonable time.

FIG. 2 shows the cementitious slurry displacement in accordance with the invention. Because a cementitious slurry 38 is used which is compatible with drilling fluid or mud 40, the region 42 at the bottom of the float shoe and up the annulus is a compatible mixture of cementitious slurry and drilling fluid which will set to a hard cement. As can be seen there is direct contact at interface 44 between the displacement fluid 30 amid the compatible cementitious slurry 38.

While this has been described in connection with the cementing of a liner wherein the cementitious slurry is forced into the annular space 46 between the liner and the casing, it is equally applicable to cementing a casing wherein the cementitious slurry is forced up an annulus between the casing and the borehole wall.

Drilling Fluid

The term 'drilling fluid' as used herein means water or oil based fluids which contain water and at least one other additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

The drilling can be carried out using a conventional drilling fluid or by utilizing a universal fluid as described herein.

Generally, in the universal fluid embodiment, the starting material to which the cementitious material is added to give the universal drilling fluid used in this invention is a conventional drilling fluid. The term 'water-based fluid' is intended to encompass both fresh water muds, salt water-containing muds, whether made from seawater or brine, and other muds having water as the continuous phase including oil-in-water emulsions.

It is sometimes desired that the water-based drilling fluids use water-containing dissolved salts, particularly sodium chloride. In these instances, 0.1 to 26 wt %, preferably 3 to 10 wt % sodium chloride may be used. One suitable source is to use seawater or a brine solution simulating seawater. Particularly in the embodiment using slag, the strength of the resulting cement is actually enhanced which is contrary to what would be expected in view of the intolerance of Portland cement to brine. Various salts, preferably organic salts, are suitable for use in the drilling fluid used in this invention in addition to, or instead of NaCl, including, but not limited to, NaBr, KCl, $CaCl_2$, $NaNO_3$, $NaC_2H_3O_2$, $KC_2H_3O_2$, $NaCHO_2$ and $KCHO_2$ among which sodium chloride is preferred, as noted above. These salts can be used, if desired, up to the saturation point under the conditions employed.

The term 'oil-based fluids' is meant to cover fluids having oil as the continuous phase, including low water content oil-base mud and invert oil-emulsion mud.

A typical mud formulation to which cementitious material may be added to form a universal drilling fluid is as follows: 10–20 wt % salt, 8–10 lbs/bbl bentonite, 4–6 lbs/bbl carboxymethyl starch (fluid loss preventor), sold under the trade name "BIOLOSE" by Milpark Drilling Fluids, 0.5–1 lbs/bbl partially hydrolyzed polyacrylamide (PHPA) which is a shale stabilizer, sold under the trade name "NEWDRIL" by Milpark Drilling Fluids, 1–1.25 lbs/bbl CMC sold under the trade name "MILPAC" by Milpark Drilling Fluids, 30–70 lbs/bbl drill solids, and 0–250 lbs/bbl barite.

Thus, the universal fluid makes possible a method for drilling and cementing a well comprising preparing a universal fluid by mixing a drilling fluid and a cementitious material; drilling a borehole with the universal fluid and laying down a settable filter cake on the walls of the borehole during drilling of the well; adding additional cementitious material and/or accelerators (or reactive second components) and introducing the thus-formed cementitious slurry into the wellbore and into an annulus surrounding a pipe in accordance with the direct displacement method of this invention where it hardens and sets up forming a good bond with the filter cake which filter cake, by itself, actually hardens with time because of the presence of cementitious material therein. This hardening is facilitated by any accelerators which may be present in the cementitious slurry and which migrate by diffusion and/or filtration into the filter cake.

Non-Conventional Cements

The cementitious material is one selected from the group consisting of blast furnace slag, a metal oxide component used to produce an ionomer and a metal oxide component used to produce a phosphorus salt. By 'blast furnace slag' is meant the hydraulic refuse from the melting of metals or reduction of ores in a furnace as disclosed in Hale and Cowan, U.S. Pat. No. 5,058,679 (Oct. 22, 1991), the disclosure of which is incorporated herein by reference. By 'phosphorus salt' is meant a phosphonate, a phosphate or a polyphosphate as is described in detail hereinafter.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness.

Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2,000 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: $SiO_2$, 30–40; $Al_2O_3$, 8–18; CaO, 35–50; MgO, 0–15; iron oxides, 0–1; S, 0–2 and manganese oxides, 0–2. A typical specific example is: $SiO_2$, 36.4; $Al_2O_3$, 16.0; CaO, 43.3; MgO, 3.5; iron oxides, 0.3; S, 0.5; and manganese oxides, <0.1.

Blast furnace slag having relatively small particle size is frequently desirable because of the greater strength it imparts in many instances to a final cement. Characterized in terms of particle size the term "fine" can be used to describe particles with a Blaine specific surface area in the range of 4,000 to 7,000 $cm^2/g$, corresponding to 16 to 31 microns in size; "microfine" can be used to describe those particles with a Blaine specific surface area in the 7,000 to 10,000 $cm^2/g$ range that correspond to particles of 5.5–16 microns in size and "ultrafine" can be used to describe particles with a Blaine specific surface area over 10,000 $cm^2/g$ that correspond to particles 5.5 microns and smaller in size. Small particle size blast furnace slags are available from Blue Circle Cement Co., Koch Industries, Tulsa, Okla., under the trade name "WELL-CEM", and from Geochem under the trade name "MICROFINE MC100".

However, it is very time consuming to grind blast furnace slag to these particles sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 10 wt % can be ground to the ultrafine particle size and the remainder ground in a normal way thus giving particles generally in a size range of greater than 11 microns, the majority being in the 11 to 31 micron range.

Suitable activators include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, titanium carbonate, potassium carbonate, sodium hydroxide, potassium hydroxide, potassium sulfate, potassium nitrite, potassium nitrate, calcium hydroxide, sodium sulfate, copper sulfate, calcium oxide, calcium sulfate, calcium nitrate, calcium nitrite, and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to 'lbs/bbl' means pounds per barrel of final cementitious slurry.

By ionomer is meant organometal compositions having a metal attached to or interlocking (crosslinking) a polymer chain or chains. Suitable polymer components of such ionomers can be represented by the formula:

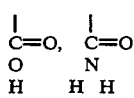

wherein A is

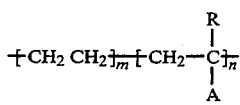

or a mixture of

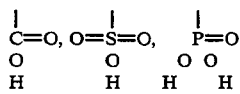

and wherein R is H or a 1-10 carbon atom alkyl radical. The ratio of m to n is generally within the range of 0:1 to 100:1, preferably 0.1:1 to 10:1.

The polymers generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. Another polymer is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 1,000 to 250,000, most preferably 10,000 to 100,000.

Carboxylate polymer with a low ratio of COOH: C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000-15,000,000 molecular weight are suitable. The copolymers will generally have from 2-99, preferably 5-80, more preferably 10-60 mole percent acid-containing units.

The poly(carboxylic acid) component can be any water soluble or water dispersable carboxylic acid polymer which will form ionomers. Ionomer forming polymers are well known in the art. Suitable polymers include poly (acrylic acid) poly (methacrylic acid), poly (ethacrylic acid), poly (fumaric acid), poly (maleic acid), poly(itaconic acid) and copolymers such as ethylene/acrylic acid copolymer and ethylene/methacrylic acid copolymer. The copolymers are generally random copolymers. An example of phosphonic acid polymers is poly(vinyl phosphonic acid) which is made from vinyl phosphonic acid,

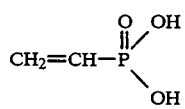

Suitable copolymers containing vinyl phosphonic acid include vinyl phosphonic acid/acrylic acid copolymer as well as copolymers witch other unsaturated monomers, with or without a functional group.

In some instances, it is preferred to use water dispersable, as opposed to water soluble, polymers. Ideally, in such instances the melting point of the polymer should be higher than the placement temperature (circulating temperature) in the wellbore during the "cementing" operation and lower than the maximum, static temperature of the surrounding formations. It is desirable for the polymer to melt and react with the metal oxide component after placement as the temperature in the wellbore increases from the circulating temperature to the static temperature of the surrounding formations.

The ionomers suitable for use in this invention are the water-insoluble reaction product of a proton acceptor metal compound which serves as the cementitious component and a carboxylic, sulfonic, or phosphonic acid polymer component. The metal compound generally is a metal oxide such as CaO, MgO or ZnO. The preferred metal oxides are magnesium oxide and zinc oxide, and most preferably, magnesium oxide. The applicable metal oxides are generally fired at temperatures above 1,000° F. for several hours to reduce chemical activity prior to grinding to final particle size for use in reacting with the acid component.

In instances where it is desired that the metal compound component add weight to the drilling fluid, the metal compound is preferably a water-insoluble metal compound with a specific gravity of at least 3.0, preferably 3.5. By 'insoluble' is meant that less than 0.01 parts by weight dissolve in 100 parts by weight of cold (room temperature) water.

The amount of polymer utilized will vary widely depending upon the carboxylic acid content of the polymer; broadly, 10 to 200 preferably 10 to 100, most preferably 10 to 80 wt %, based on the weight of metal compound, can be present. With the polymers having a low ratio of m to n, a smaller amount is required because of the higher functional group content of the polymer. Conversely, with the high ratio of m to n, an amount of polymer toward the higher end of the ranges is preferred.

Phosphates and phosphonates, referred to herein as phosphorus salts, used in accordance with this invention also are produced from a two-component composition, the first component of which is a metal compound identical in scope to that used in the ionomers as described hereinabove so long as the resulting phosphorus salt is insoluble in water. Most preferred are CaO, MgO and ZnO.

The second component is a phosphonic or phosphoric acid, preferably a polyphosphoric acid. The term 'phosphoric acid' is meant to encompass both linear and cyclic polyphosphoric acids. These second component acids are referred to herein as phosphorus acids. Linear phosphoric acids can be depicted by the general formula $H_{n+2}P_nO_{3n+1}$ where n is 1 to 100, preferably 2 to 50, more preferably, 2 to 20. Examples include di-(pyro)phosphoric acid, tri-(tripoly)phosphoric acid, tetra-phosphoric acid and higher molecular weight polyphosphoric acids as well as phosphoric acid. Mixtures of acids, including those traditionally referred to as meta phosphoric acid, are particularly suitable for use in this invention.

The formation of one phosphate cement using a metal oxide as the metal compound can be depicted as follows:

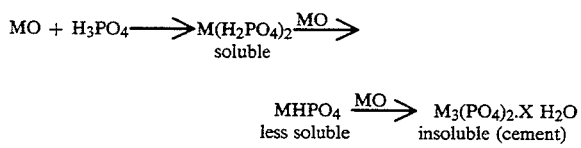

where:
X is usually 4; and
MO = metal oxide which is amphoteric or is a proton acceptor.

With the ionomers, and the phosphorus salts when made with a polyvalent metal compound, a crosslinked network structure exists as a result of the addition of the second component, thus giving a very strong solid cement.

The particle size of the metal compound component can vary widely. Generally, it will be within the range such that the powder exhibits a surface area within the range of 1,000 cm$^2$/g to 30,000 cm$^2$/g, preferably 1,500 cm$^2$/g to 25,000 cm$^2$/g, most preferably 2,000 cm$^2$/g to 20,000 cm$^2$/g.

The phosphorus acid is generally used in a stoichiometric amount or less, since an excess should generally be avoided. From 1 to 10 or even 1 to 50 mole percent less than a stoichiometric amount is suitable. Generally, a stoichiometric amount will be between 10 and 100 weight percent based on the weight of the metal compound.

Because of the mass provided by the metal compound component of the ionomer or the polyphosphorus salt, these cementitious materials are generally actually heavier than most slag or Portland cement materials. In the embodiments using these cementitious materials this high density provides significant advantages in certain utilities. For one thing, a smaller amount of the material can be used and still achieve a final mud and ultimately cement of a desired density. Secondly, because of the high density, it is possible to operate without weighting agents such as barium sulfate or barite. They offer a further advantage in that they do not set up until the second component is added.

The metal compound of the ionomer or phosphorus salt can be used as the sole cementitious material or can be used in admixture with siliceous hydraulic materials such as the blast furnace slag or Portland cement. In one embodiment an hydraulic component such as blast furnace slag can be used to give the metal ion component of the ionomer or phosphate to give, in effect, a mixture formed in situ.

Preferably, when the ionomer or phosphorus salt is utilized, the metal compound is added first and thereafter at such time as it is desired for the cement to be activated to set, the other component is added. In the case of the universal fluids, a portion of the total metal compound can be added to the drilling fluid, the remainder being added when the cementitious slurry is being formed.

The preferred sequence for universal fluid in this embodiment of the invention is to prepare the drilling fluid containing a portion of the total slag or metal compound to be utilized, carry out the drilling operation, dilute the fluid, add the remainder of the slag or metal compound, and thereafter add the acid components and utilize the cement for its intended purpose such as cementing a casing.

Dilution

Generally, the used universal fluid will be diluted and more cementitious material added as well as the reactive second component when the cementitious slurry is formed. Dilution of the drilling fluid is usually needed for control of the density and rheology of the final cementitious slurry. The amount of dilution can vary widely depending on the desired application. Generally, the fluid will be diluted with from 5 to 200%, preferably 5 to 100%, more preferably 5 to 50% by volume (water in the case of a water-based fluid) per volume of initial drilling fluid. In one particularly preferred embodiment, the dilution is such that on addition of the cementitious component (or in the case of the universal fluid addition of the remaining cementitious component) the final density will be within the range of 30% less to 70% more than the original density, preferably within the range of 15% less to 25% more, most preferably, essentially the same, i.e., varying by no more than ±5 wt %. This is particularly valuable in an operation where there is a small difference between the pressure needed to prevent blowout and the pressure which would rupture or fracture the formation through which drilling has taken place.

The dilution fluid can be the same or different from that used to make the drilling fluid initially. In the case of brine-containing fluids the dilution fluid will generally be brine also. This is of particular benefit in offshore drilling operations where fresh water is not readily available but seawater is abundant.

Preferably, the dilution is carried out "on the fly" by adding dilution fluid to a flowing stream of the used drilling fluid and thereafter adding the additional ingredients.

In some instances it is desirable to sequence the incorporation of ingredients into the drilling fluid. For instance, with slag as the cementitious component, it may be desirable to introduce and mix thinners and/or retarders and activators and thereafter introduce the slag. This is particularly true if mixed metal hydroxides are used in the drilling fluid to impart thixotropic properties. The mixed metal hydroxides provide better solids suspension. This, in combination with the settable filter cake provided in the technique of this invention, greatly enhances the cementing in a restricted annulus. The mixed metal hydroxides are particularly effective in muds containing clay such as sodium bentonite. Preferred systems thickened in this way contain from 1–20 lbs/bbl of clay such as bentonite, preferably 2 to 15 lbs/bbl, most preferably 7 to 12 lbs/bbl. The mixed metal hydroxides are generally present in an amount within the range of 0.1 to 2 lbs/bbl of total drilling fluid, preferably 0.1 to 1.5 lbs/bbl, most preferably 0.7 to 1.2 lbs/bbl. Mixed metal hydroxides are known in the art and are trivalent metal hydroxide-containing compositions such as $MgAl(OH)_{4.7}Cl_{0.3}$. They conform essentially to the formula

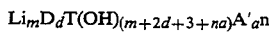

$$Li_mD_dT(OH)_{(m+2d+3+na)}A'_a{}^n$$

where

M represents the number of Li ions present; the said amount being in the range of zero to about 1;

D represents divalent metals ions; with d representing the amount of D ions in the range of zero to about 4;

T represents trivalent metal ions;

A' represents monovalent or polyvalent anions of valence −n, other than OH⁻, with a being the amount of A' anions; and where (m+2d+3+na) is equal to or greater than 3. A more detailed description can be found in Burba, U.S. Pat. No. 4,664,843 (May 12, 1987). The mixed metal hydroxides in the drilling fluid, in combination with blast furnace slag, tend to set to a cement having considerable strength in a comparatively short time, i.e., about one-half hour at temperatures as low as 100° F. This can be a major asset in some applications. In such instances, a thinner such as a lignosulfate is preferably added before adding slag. However, one of the advantages of this invention is that it seduces or eliminates the need for additives to control free water or solids suspension. The activator or activators can be added either before or after the addition of the additional blast furnace slag.

In some instances, it may be desirable to use a material for a particular effect along with the activator even though it may also act as a retarder. For instance, a chromium lignosulfonate may be used as a thinner along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, and mixtures thereof.

In the case of blast furnace slag, the amount of slag present in the universal fluid is generally within the range of 1 to 100 lbs/bbl of final drilling fluid, preferably 10 to 80 lbs/bbl, most preferably 20 to 50 lbs/bbl. In the case of the organometals (ionomers) or phosphorus salts the amount of metal compound initially present in universal fluid can also vary widely. Generally, 1 to 500 lbs/bbl, preferably 50 to 300 lbs/bbl, most preferably 100 to 250 lbs/bbl of the metal compound are used.

The total amount of cementitious material in the cementitious slurry will typically range from about 20 lbs/bbl to about 600 lbs/bbl, preferably 100 lbs/bbl to 500 lbs/bbl, most preferably 150 lbs/bbl to 350 lbs/bbl.

Reference herein to additives encompasses both the specialized additives necessary for this invention such as the carboxylic acid polymer in the case of the ionomer or the polyphosphoric acid in the case of the polyphosphate as well as conventional additives.

Additives

Conventional additives which can be added include accelerators, retarders, and other known components of cementitious materials.

Other additives which can be present in the drilling fluid include low and medium yield clays, carboxymethyl cellulose, polyacrylonitrile, natural gum, molecularly dehydrated phosphate, tannin compounds, quebracho, mined lignites, lignosulfonates broadly, mica, sugar cane fibers and granular materials. In addition to bentonite, amorphous and crystalline clays such as kaolinite, halloysite, smectite, montmorillonite, illite, saconite, vermiculite, chlorite, attapulgite, sepiolite, palygorskite and Fuller's earth are useful in combination with mixed metal hydroxides.

In yet another related embodiment of this invention, universal fluid is utilized in a drilling operation and thereafter additional cementitious material and/or additives, or the second component of a two-component system, is gradually added so as to gradually change the circulating material from a drilling fluid to a cementitious slurry.

Filter Cake Setting

In yet another embodiment of this invention the drilling process is carried as described hereinabove with a universal fluid to produce a borehole through a plurality of strata thus laying down a filter cake. Prior to the cementing operation an activator or reactive second component is passed into contact with the filter cake, for instance by circulating the activator or reactive second component down the drill string and up the annulus between the drill string and the filter cake, or else the drill string is removed and the casing inserted and the activator circulated down the casing and up the annulus. As used herein 'down' as it relates to a drill string or casing, means in a direction toward the farthest reach of the borehole even though in rare instances the borehole can be disposed in a horizontal position. Similarly, 'up' means back toward the beginning of the borehole. Preferably, the circulation is carried out by using the drill string, this being the benefit of this embodiment of the invention whereby the filter cake can be "set" to shut off gas zones, water loss, or to shut off lost circulation in order to keep drilling without having to remove the drill string and set another string of casing. This can also be used to stabilize zones which may be easily washed-out (salt zones wherein the salt is soluble in water, for instance) or other unstable zones. After the drilling is complete the drill string is removed, and the cementing carried out as described hereinabove. This can be accomplished by circulating a separate fluid containing the activator or by adding an activator such as an alkali as described hereinabove to the drilling fluid.

Conventional spacers may be used in the above described sequence. Also, any left over fluid having activators therein may be displaced out of the borehole by the next fluid and/or a spacer fluid and stored for subsequent use or disposal.

In this embodiment where the filter cake is "set", the activator can be any of the alkaline activators referred to hereinabove such as a mixture of sodium hydroxide and sodium carbonate when the universal fluid contains slag. The reactive second component is a polymer with a functional group such as a carboxy as described hereinabove wherein the universal fluid contains a metal compound proton acceptor, or the phosphoric or phosphonic acid component of a phosphate or phosphonate when the universal fluid contains a metal compound proton acceptor.

In another embodiment of this invention, the drilling is done using a drilling fluid containing a metal compound to lay down a filter cake which is preferably set as described above with a reactive second component and thereafter the cementing is done with a cementitious slurry comprising blast furnace slag, water and an accelerator.

Also, the use of blast furnace slag as described above for the metal compound source is applicable in this embodiment as well. Thus, an ionomer or phosphate salt can be formed as filter cake followed by cementing with blast furnace slag.

The invention is of particular value in cementing of large casings and liners as the following Example shows. By 'large' is meant 12- to 30-inch, generally 16-inch or greater outside diameter.

EXAMPLES

Control

Eight separate 16-inch casings were set in boreholes drilled using a conventional drilling fluid having the following composition: 10–20 wt % salt, 8–10 lbs/bbl bentonite, 4–6 lbs/bbl carboxymethyl starch (fluid loss preventor), sold under the trade name "BIOLOSE" by Milpark, 0.5–1 lbs/bbl partially hydrolyzed polyacrylamide (PHPA) which is a shale stabilizer, sold under the trade name "NEWDRIL" by Milpark, 1–1.25 lbs/bbl CMC sold under the trade name "MILPAC" by Milpark, 30–70 lbs/bbl drill solids, and 0–250 lbs/bbl barite.

The mud was displaced with a 16.4 lb/gal Class H Portland cement slurry. The cement slurry was forced down the casing in a manner shown in FIG. 1 herein using a wiper plug followed by additional drilling fluid (FIG. 1 differs in that it depicts cementing a liner whereas this control involved cementing a casing). All 8 of the casings failed a standard 2000 psig pressure test indicating a poor cementing job and further indicating that the wiper plug seal against the landing collar had failed.

Example 1

In experiments to test this invention an identical 16-inch casing was set in a borehole drilled with identical drilling fluid to that described in the Control. A cementitious slurry was made by combining drilling fluid of the type used in the drilling with blast furnace slag activators and additives. Two separate batches were prepared; one for the lead part of the cementing and one for the tail part. A sample of each was taken prior to their use for the purpose of determining the properties of the cementitious slurry and the compressive strength of a test specimen made from each sample using the temperature anticipated for the bottom of the borehole.

The mud volume refers to barrels of mud per barrel of final cementitious slurry whereas the other ingredients are listed in terms of pounds per barrel of final cementitious slurry. These are set out hereinbelow.

TABLE

EXAMPLE 1

| Slag-Mix Type | Lead | Tail |
| --- | --- | --- |
| Slurry Density, lb/gal | 13.5 | 15.3 |
| Mud Density, lb/gal | 11.2 | 11.2 |
| Mud volume, bbl cement | 0.81 | 0.08 |
| "SPERCENE CF[1]", lbs/bbl cement | 1.0 | — |
| "UNICAL CF[2]", lbs/bbl cement | — | 2.5 |
| NaOH, lbs/bbl cement | 5 | 5 |
| $Na_2CO_3$, lbs/bbl cement | 10 | 5 |
| "NEWCEM[3]", lbs/bbl cement | 170 | 300 |
| Rheology at 70° F. | | |
| Plastic viscosity, cp | 19 | 75 |
| Yield point, lb/100 ft$^2$ | 3 | 23 |
| 10-sec. gel strength, lbs/100 ft$^2$ | 3 | 20 |
| 10-min. gel strength, lbs/100 ft$^2$ | 14 | 70 |
| Bottom Hole Static Temperature, °F. | 100 | 105 |
| Compressive Strength, psi | 1,880 | 5,300 |

[1]"SPERCENE CF" is a trade name of M-I Drilling Fluids for chrome lignosulfonate.
[2]"UNICAL CF" is a trade name of Milchem for chrome-free lignosulfonate.
[3]"NEWCEM" is ground blast furnace slag of about 5500 Blaine specific surface area available from Blue Circle Cement Co.

The blast furnace slag cementitious lead slurry was introduced into the casing displacing the drilling fluid. The lead slurry was followed by the tail slurry in order to leave a high strength cement around the casing shoe. The tail slurry was then displaced down the casing by direct contact of a measured volume of drilling fluid against the top of the cementitious slurry column as shown in FIG. 2. The casing was given the same standard 2000 psig pressure test and passed.

This shows that using direct fluid contact in accordance with the technique of this invention not only simplifies the procedure by eliminating the wiper plug but gives better results.

Two additional experiments were carried out under essentially identical conditions with the same satisfactory results.

Test Data

This run, while not carried out in accordance with the invention, is presented to demonstrate that a finer ground blast furnace slag produces higher strength and quicker set. The drilling fluid was made up in seawater.

| 12 lb/gal Blast Furnace Slag Setting and Set Strengths at 40° F. | Run | |
| --- | --- | --- |
| | 1 | 2 |
| Slurry Density, lb/gal | 12.0 | 12.0 |
| Mud volume, bbl | 0.773 | 0.773 |
| Mud Type | (A) | (A) |
| "Q-BROXIN[1]", lb/bbl | 3 | 3 |
| NAOH, lb/bbl | 8 | 8 |
| $Na_2CO_3$, lb/bbl | 12 | 12 |
| "NEWCEM[2]", lb/bbl (5,500 cm$^2$/gm) | 200 | — |
| Ultrafine slag[3] lb/bbl (10,040 cm$^2$/gm) | — | 200 |
| Rheology at 73° F. | | |
| Plastic viscosity, cp | 27 | 24 |
| Yield point, lb/100 ft$^2$ | 25 | 60 |
| 10-sec. gel strength, lb/100 ft$^2$ | 18 | 35 |
| 10-min. gel strength, lb/100 ft$^2$ | 36 | 61 |
| Set time (Hrs) | 116 | 74 |
| Final Compressive Strength, psi | 870 | 1,340 |

-continued

| 12 lb/gal Blast Furnace Slag Setting and Set Strengths at 40° F. | Run | |
|---|---|---|
| | 1 | 2 |
| Mud - 10 lb/bbl prehydrated gel; 8.7 lb/gal Density | | |

[1]Chrome lignosulfonate sold by Baroid Company under the trade name "Q-BROXIN".
[2]Blast furnace slag sold under the trade name "NEWCEM" by Blue Circle Cement Co.
[3]Blast furnace slag sold by Koch Industries, Tulsa, Oklahoma, under the trade name "WELL-CEM".

Illustrative Run 2

This run while not using the direct displacement technique of the invention demonstrates the excellent seal that would be obtained even under the most adverse circumstances when using the direct displacement technique of the invention.

A 13.9 lb/gal universal fluid (UF) was prepared using a 13.5 lb/gal mud having the following composition: 20 wt % salt (140,000 mg/l), 8–10 lbs/bbl bentonite, 4–6 lbs/bbl carboxymethyl starch, sold under the trade name "BIOLOSE" by Milpark, 0.5–1 lbs/bbl partially hydrolyzed polyacrylamide (PHPA), sold under the trade name "NEWDRIL", by Milpark, 1–1.25 lbs/bbl CMC, sold under the trade name "MILPAC" by Milpark, 30–70 lbs/bbl drill solids, 0–250 lbs/bbl barite, and 40 lbs/bbl of blast furnace slag sold under the trade name "NEWCEM" by Blue Circle Cement Company.

The UF was designed to be a drilling fluid at temperatures 120° F. through 160° F. and to provide a settable filter cake for better zonal isolation and for protection of the formation. A full-scale horizontal wellbore model was used to test the hardening of this UF. This universal fluid was tested to show that it and its filter cake would set up under downhole conditions.

The 13.9 lbs/gal UF was circulated through the model and a filter cake was formed. A portion of the UF was then converted into a 15.4 lb/gal cement slurry by the addition of slag and activators as described hereinafter and was used to displace the UF in the wellbore model. The wellbore model was heat aged at 200° F. for three weeks. The most important objective of this test was to deposit the UF in simulated washed-out sections and to show that undisplaced UF pockets can be set up in the worst possible physical conditions.

Test Objectives were: 1) Demonstrate that undisplaced pockets of the 13.9 lb/gal UF can set up under downhole conditions in order to eliminate unset fluids and filter cakes in the test model, 2) Demonstrate that the 13.9 lb/gal UF could be converted into a cement slurry with satisfactory slurry and set cement properties, 3) Demonstrate that a UF/cement slurry job can improve zonal isolation (improved shear and hydraulic bond in the model) and provide lateral casing support.

Test Conditions: Three washed-out sections (1", 2" and 6" wide) were specially built by modifying a synthetic wellbore model. The displacement test on the modified model was based on the following field conditions:

UF Condition—Drilling a 10⅝in. deviated hole at borehole circulating temperature (BHCT) of 120° F. to 160° F.

Cement slurry Condition—Borehole static temperature (BHST) of 200° F. (18,000 ft.)

Displacement Model: A 5-inch outside diameter (OD), 15-ft long steel casing in a 6½-inch inside diameter (ID) synthetic core, simulating a formation with the 3 washed-out sections, was used in a horizontal position using the following test conditions: 1) slow displacement rates (1 bbl/min) in order not to wash away the deposited filter cake and to preserve undisplaced UF in the washed-out sections, 2) 100% casing standoff (centralized).

The synthetic core (formation) was a 1¾-inch thick layer of a permeable sand-epoxy mix on the inner circumference of the model (10¾-in. OD and 10-in. ID steel casing). Three washed out sections (sharp edged with no transition zones) were made by removing portions of the simulated sand-epoxy formation before welding the sections of the 15-ft total length steel casing together. The tops of the three wash-outs (1", 2" and 6" length) were placed at 5 feet, 7 feet, and 10 feet respectively from the bottom of the wellbore model. As mentioned earlier, the 5-in. OD steel casing was centralized inside the wellbore model leaving a theoretical annular clearance of ¾-inch except in the wash-outs where it was 2½-inch wide.

The ¾-inch annular clearance simulates the narrow annulus in a slim hole well.

Deposition of filter cake: The above-described 13.9 lb/gal universal fluid was circulated for 2 hours through the water-saturated wellbore model at 3–4 bbl/min. The wellbore model was shut in, electrically heated to 140° F. and pressurized. Filtrate was collected at a pressure differential of 100 psi to build a filter cake approximately ⅛th-inch thick on the core.

Displacement: After the overnight filtering period at 140° F., the UF was circulated through the wellbore model at 1 bbl/min for 20 minutes while collecting additional filtrate. During the time of circulation, a 5-bbl batch of UF was isolated from the active mud (UF) system and converted it into a 200 lb/bbl cement slurry by adding additional 160 lb/bbl "NEWCEM" brand slag, activators and a retarder. The cement slurry was then dyed by adding 2.5 lb/bbl red iron oxide. The activator system was made up of 4 lb/bbl caustic soda, 14 lb/bbl soda ash and 6 lb/bbl "SPERSENE CF" (chrome free lignosulfonate manufactured by MI Drilling Fluids). The UF was displaced out of the wellbore model with the dyed cement slurry at 1–2 bbl/min until the initial portion of uncontaminated cement slurry was noted at the discharge. The slow displacement was employed in order to leave substantial amounts of undisplaced UF in the model. The cement slurry was then circulated through the wellbore model for an additional 20 minutes at 1–2 bbl/min.

Evaluation of Core: After a three-week aging period at 200° F., the wellbore model was allowed to cool to room temperature. The model was then disassembled and sawed into three sections. These sections were again sawed into smaller sections for further shear and hydraulic bond tests.

All the available cross sections were photographed for estimating displacement efficiency. As planned, the displacement efficiency was about 55%. The expected poor displacement efficiency of the washed-out model was accentuated by the high angle of the wellbore model. Although the casing was centralized, a perfect centralization was not obtained. Much of the UF was not displaced out of the narrow side of the annulus.

The presence of undisplaced UF was evident all the way from one end to the other end, especially on the bottom side. Even so, the UF filter cakes and undisplaced UF pockets were found to be very hard. A hand held penetrometer test indicates than the UF filter cakes and cement slurry had compressive strengths in excess of 750 psi (maximum reading). In essence, an excellent cement job was obtained in spite of the slow pumping rates, high angle (90°) of the hole and presence of the three wash-outs. The cement job would have been very poor with a displacement efficiency of 55% if the universal fluid/cement slurry had not been used.

Blocks containing the washed-out portions of the model were sawed and further evaluated. Lengthwise diamond saw cuts were made to produce parallel faced slices about 1¼-inch to 1¾-inch thick. These slices exposed the newly cut cross sections of the formation, the annulus, the wash-outs and the hardened UF, UF filter cake, and the cement slurry.

Hardened UF and UF filter cake were found in the 1-inch wash-out, at the base of the 2-inch wash-out, and at the base corners of the 6-inch wash-out. The increased hardness near the permeable formation faces in the wash-outs is caused by the concentration of the UF by fluid loss. The hardened UF fluids showed a compressive strength between about 500 and 1500 psi. Although there were various lamination in the samples, the annulus and washed-out sections were completely cemented and the overall zonal isolation was excellent.

Additionally, 8 slag cement slurry samples were taken during the displacement and cured in 2-inch cube molds at 200° F. for one week. An average compressive strength of 1874 psi with a standard deviation of 204 psi was obtained.

Hydraulic Bond Test Results: The top section (4.5-ft long) was cut into two smaller sections. In-situ hydraulic bond tests were conducted on these cores (2.25-ft long) using a fluorescent dyed water. Two taps (front and back) were drilled to the casing on the core and nipples were installed using epoxy resin. Dyed water was pumped through the nipples using an hydraulic pump and maximum breakdown pressures were recorded as hydraulic bond strength. The test results were as follows:

| Core/pressure Tap | Hydraulic Bond, psi |
|---|---|
| H-1, Front | 1,800 |
| H-1, Back | 400 |
| H-2, Front | 550 |
| H-2, Back | 750 |

Shear Bond Test Results: The two bottom sections of the model (4.5-ft long) were cut into 5 pieces for shear bond tests. The sections containing the wash-outs were excluded from the shear bond tests. Shear bond was measured by pressing out the casing on a hydraulic press. The test results were as follows:

| Sample ID | Pipe Length (in.) | Force (lbs) | Shear Bond (psi) |
|---|---|---|---|
| S-1 | 10.175 | 4,140 | 26.2 |
| S-2 | 9.0 | 19,200 | 135.38 |
| S-3 | 8.5 | 1,700 | 12.7* |
| S-4 | 10.5 | 10,200 | 60.8 |
| S-5 | 10.675 | 5,360 | 32.0 |
| S-6 | 10.875 | 4,960 | 29.1 |
| S-7 | 10.75 | 1,580 | 9.4* |
| S-8 | 8.675 | 2,000 | 14.7* |

*Specimens appeared damaged during sawing the core.

In addition, 4 slag cement slurry samples were taken during the displacement and cured in laboratory shear bond molds with a steel pipe having a dimension of 4-in. length and 1.5-in. OD at 200° F. for one week. An average shear bond was 46.5 psi.

Conclusions: The undisplaced pockets of the UF were set hard with a compressive strength between 500 and 1,500 psi. Excellent hydraulic bond data were obtained. Although varied, shear bond data are very good. It is demonstrated that (1) a blast furnace slag universal fluid can achieve a 100% displacement efficiency by eliminating unset pockets of mud even in a narrow annulus, (2) a blast furnace slag universal fluid can improve a lateral support of casing by eliminating unset materials and providing additional strength through solidification of those portions which otherwise would be unset, (3) a blast furnace slag UF can improve zonal isolation through improving shear and hydraulic bonds, and (4) a high density blast furnace slag universal fluid can be formulated and utilized at elevated temperatures.

Two ultrasonic cement analyzer (UCA) cells, sold by Halliburton, with the 15.4 lb/gal slag cement slurry sample caught during the displacement were run at 200° F. Additional tests were run with the slag cement slurry sample to obtain rheology, density, API fluid loss, and free water data. The test results of the 15.4 lb/gal slag cement slurry are summarized in the following table.

| FORMULATION: | 1 bbl Mud + 4 lbs NAOH + 14 lbs $Na_2CO_3$ + 8 lbs SPERCENE brand chromium lignosulfonate + 200 lbs NEWCEM brand blast furnace slag |
|---|---|
| SLAG CEMENT SLURRY PROPERTIES: | |
| Plastic Viscosity | = 14 cp |
| Yield Point | = 10 lb/100 ft.$^2$ |
| Gel Strengh, 10 sec/10 min | = 8/36 lb/100 ft.$^2$ |
| API Fluid Loss | = 4.9 cm$^3$ |
| High Temperature Fluid Loss | = 24 cm$^3$ at 160° F. |
| Free Water | = 0 cm$^3$ |
| Thickening Time | = 7:43 hrs at 170° F. |
| SLAG CEMENT SET STRENGTHS after CURING AT 200° F. | |
| Compressive Strength | = 2,200 + psi |
| Shear Bond | = 30–135 psi |
| Hydraulic Bond | = 400–1,800 psi |

While this invention has been described in detail for the purpose of illustration, it is not to be construed as limited thereby, but is intended to cover all the changes and modifications within the spirit and scope thereof.

What is claimed is:

1. A method for drilling and cementing a well, comprising:
   drilling a borehole utilizing a drilling fluid, thus producing a used drilling fluid;
   combining ingredients comprising water, granulated water-quenched blast furnace slag, and activator to produce a cementitious slurry;
   disposing a pipe within said borehole;
   passing said cementitious slurry down said pipe; and
   displacing said cementitious slurry up into an annulus surrounding said pipe through direct contact by a displacement fluid comprising a portion of said used drilling fluid.

2. A method according to claim 1 wherein said drilling fluid contains water with dissolved salts.

3. A method according to claim 2 wherein said water of said drilling fluid is seawater.

4. A method according to claim 1 wherein said activator is selected from the group consisting of sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium nitrate, calcium nitrite, calcium hydroxide, sodium sulfate and mixtures thereof.

5. A method according to claim 1 wherein 5 to 25 wt % of said blast furnace slag has an ultrafine particle size.

6. A method according to claim 1 wherein said drilling fluid contains seawater, said activator is a mixture of sodium hydroxide and sodium carbonate, and wherein 5 to 25 wt % of said blast furnace slag has an ultrafine particle size.

7. A method according to claim 1 wherein said cementitious slurry is prepared by combining said used drilling fluid with said blast furnace slag and wherein said activator is a mixture of sodium hydroxide and sodium carbonate, and wherein said cementitious slurry contains 150 to 350 lbs/bbl of said blast furnace slag and wherein said pipe has a diameter of 16 inches or greater.

8. A method according to claim 7 wherein said displacement fluid comprises seawater.

9. A method according to claim 1 wherein said pipe is a casing and said annulus is the annulus between said casing and said borehole.

10. A method according to claim 1 wherein said pipe is a liner and said annulus is the space between said liner and a casing.

11. A method for drilling and cementing a well, comprising:
combining granulated water-quenched blast furnace slag having a particle size within the range of 2,000 to 15,000 cm$^2$/g with an aqueous drilling fluid, granulated water quenched said blast furnace slag being present in an amount within the range of 1 to 100 lbs/bbl of said drilling fluid plus blast furnace slag;
utilizing said drilling fluid in a well drilling operation to form a borehole to produce a used drilling fluid;
combining additional granulated water quenched blast furnace slag and an activator with said used drilling fluid to produce a cementitious slurry;
disposing a pipe within said borehole;
passing said cementitious slurry down said pipe; and
displacing said cementitious slurry up into an annulus surrounding said pipe by direct contact with a displacement fluid.

12. A method according to claim 11 wherein said activator is a mixture of sodium hydroxide and sodium carbonate and said displacement fluid comprises seawater.

13. A method for drilling and cementing a well, comprising:
combining constituents comprising water and a metal compound proton acceptor component to produce a drilling fluid;
utilizing said drilling fluid in a well drilling operation to form a borehole, thus producing a used drilling fluid and laying down a filter cake;
contacting a reactive second component with said filter cake;
disposing a pipe within said borehole after said filter cake is laid down;
passing a cementitious slurry down said pipe; and
displacing said cementitious slurry up into an annulus surrounding said pipe by direct contact with a displacement fluid.

14. A method according to claim 13 wherein said metal compound proton acceptor is metal oxide.

15. A method according to claim 13 wherein said metal compound proton acceptor is magnesium oxide.

16. A method according to claim 13 wherein said metal compound proton acceptor is supplied by blast furnace slag.

17. A method according to claim 13 wherein said reactive second component is selected from the group consisting of phosphonic acid, phosphoric acid, polyphosphoric acid and a polymer of the formula $$+CH_2\,CH_2\!\!\xrightarrow{}_{\!\!m}\!\!+CH_2-\!\!\underset{\underset{A}{|}}{\overset{\overset{R}{|}}{C}}\!\!\xrightarrow{}_{\!\!n}$$

wherein A is $$\underset{\underset{H}{O}}{\overset{\overset{|}{C}=O,}{}}\quad \underset{\underset{H}{O}}{\overset{\overset{|}{O}=S=O,}{}}\quad \underset{\underset{H\ H}{O\ O}}{\overset{\overset{|}{P}=O}{}}$$

or a mixture of $$\underset{\underset{H}{O}}{\overset{\overset{|}{C}=O,}{}}\quad \underset{\underset{H\ H}{N}}{\overset{\overset{|}{C}=O}{}}$$

and wherein R is H or a 1–10 carbon atom alkyl radical.

18. A method according to claim 17 wherein said reactive second component is poly(acrylic).

19. A method according to claim 13 wherein said cementitious slurry comprises granulated water quenched blast furnace slag and water.

20. A method according to claim 13 wherein said cementitious slurry is prepared by combining a portion of said used drilling fluid with additional metal oxide proton acceptor and additional reactive second component.

21. A method for drilling and cementing a well, comprising:
drilling a borehole utilizing a drilling fluid, thus producing a used drilling fluid;
combining ingredients comprising water, and granulated water-quenched blast furnace slag, to produce a cementitious slurry;
disposing a pipe within said borehole;
passing said cementitious slurry down said pipe; and
displacing said cementitious slurry into an annulus surrounding said pipe through direct contact by a displacement fluid comprising a portion of said used drilling fluid.

* * * * *